United States Patent [19]

Palti

[11] Patent Number: 4,588,307

[45] Date of Patent: May 13, 1986

[54] MEDICAL THERMOMETER WITH DISPOSABLE THERMOCOUPLE STRIP

[75] Inventor: Yoram Palti, Haifa, Israel

[73] Assignee: Fidelity Medical, Inc., Millburn, N.J.

[21] Appl. No.: 592,555

[22] Filed: Mar. 23, 1984

[51] Int. Cl.$^4$ .................... G01K 1/14; G01K 13/00
[52] U.S. Cl. .................... 374/170; 128/736; 136/230; 374/208; 364/557
[58] Field of Search ............ 374/170, 208, 178, 185, 374/183; 128/736; 226/181; 136/221, 230, 225; 338/26

[56] References Cited

U.S. PATENT DOCUMENTS

| | | | |
|---|---|---|---|
| 2,703,833 | 3/1955 | Vanvor | 374/208 X |
| 2,985,949 | 5/1961 | Rice | 136/221 X |
| 3,031,888 | 5/1962 | Wilhelm | 374/153 |
| 3,279,956 | 10/1966 | Ekstrom, Jr. | 374/153 X |
| 3,360,404 | 12/1967 | Beckman | 136/230 |
| 3,681,993 | 8/1972 | Campton et al. | 374/185 |
| 3,949,609 | 4/1976 | Hammerslag | 374/185 |
| 4,095,467 | 6/1978 | McGlynn | 374/183 X |
| 4,116,064 | 9/1978 | McGlynn | 338/26 X |
| 4,135,400 | 1/1979 | Maxwell et al. | 374/183 X |
| 4,174,631 | 11/1979 | Hammerslag | 374/179 |
| 4,406,550 | 9/1983 | Gray | 374/170 X |
| 4,445,787 | 5/1984 | Parker | 374/208 X |
| 4,505,599 | 3/1985 | Nonaka | 374/170 X |

Primary Examiner—Daniel M. Yasich
Attorney, Agent, or Firm—Curtis, Morris & Safford

[57] ABSTRACT

An electronic medical thermometer employs disposable thermocouple probe strips to produce substantially instantaneous readings. The disposability of the entire probe strips eliminates the danger of patient-patient or patient-practitioner cross-infection. The probe strips can be formed as individual strips or as a roll. Each strip has a substrate, thermocouples on the substrate, and a cover layer. The tip of the probe strip is uncovered so that the thermocouple junction is exposed. A feed device advances the next probe strip into place for a temperature measurement. Circuiting for this includes a cold junction compensation circuit, followed by an A/D converter, and a digital display.

8 Claims, 16 Drawing Figures

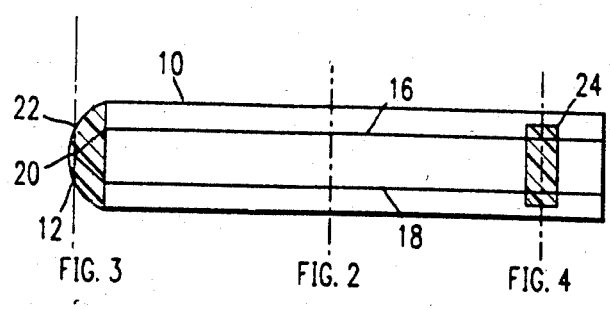
FIG. 1
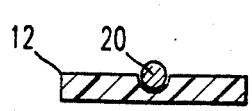
FIG. 3
FIG. 2
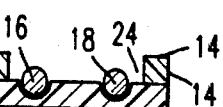
FIG. 4
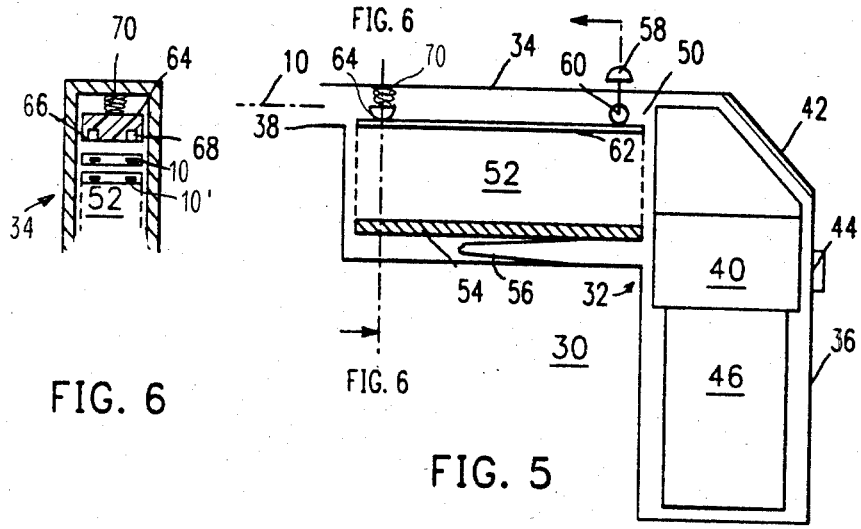
FIG. 6
FIG. 5
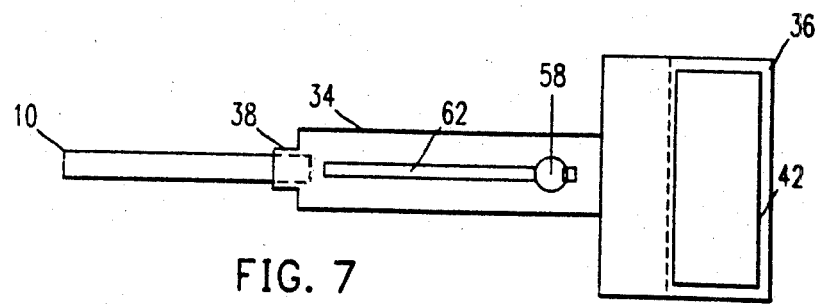
FIG. 7

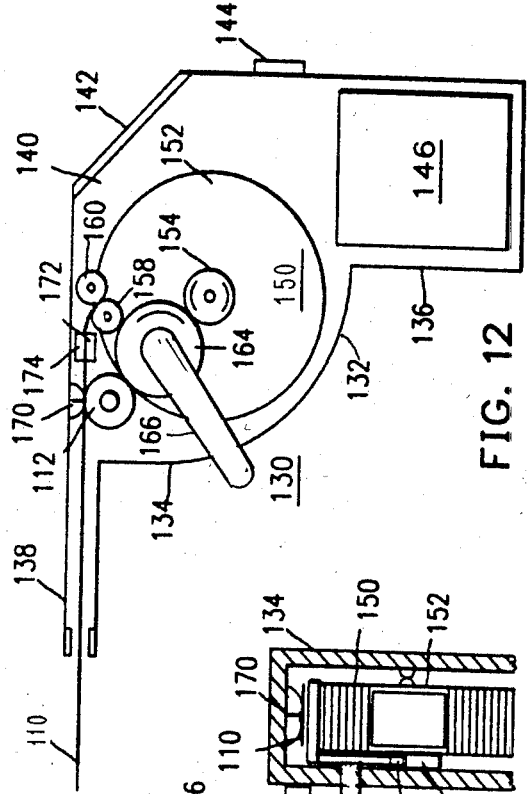
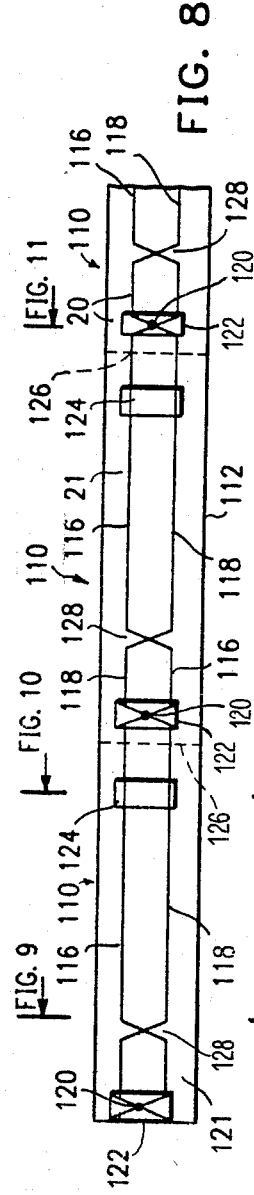
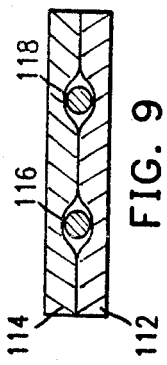
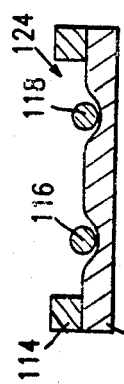
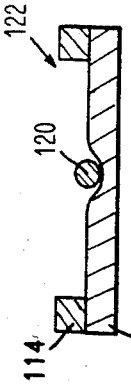

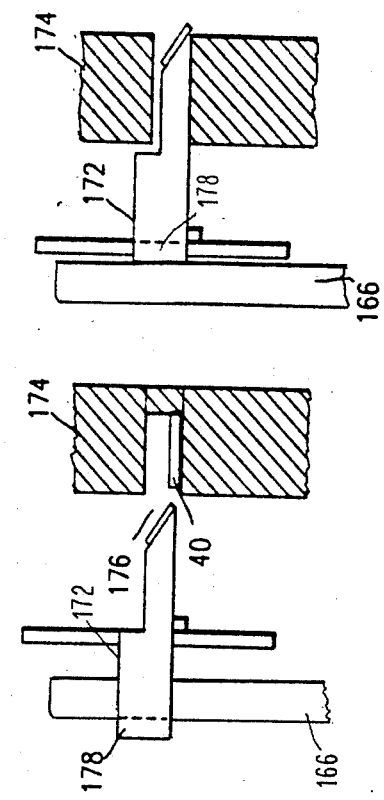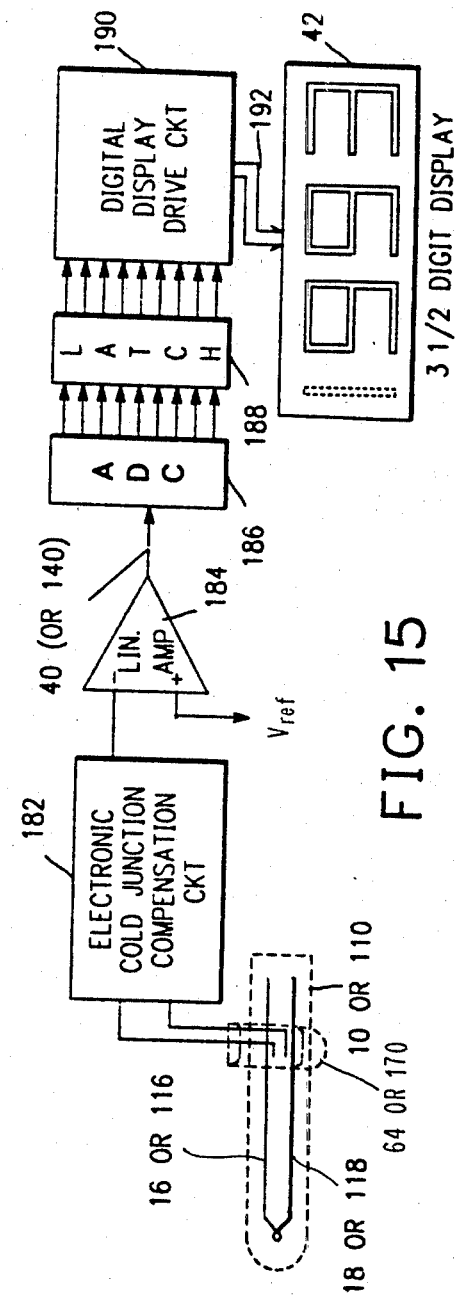

MEDICAL THERMOMETER WITH DISPOSABLE THERMOCOUPLE STRIP

This invention relates to medical instruments, especially oral thermometers and the like. The invention is more particularly directed to an electronic thermometer of the type having a disposable temperature sensing element.

Conventional electronic patient thermometers for taking a patient's oral temperature generally have a solid-state thermometer probe with a disposable cover thereon. The patient places the covered probe in his mouth, and a sensor element in the probe generates a temperature signal corresponding to the level of the patient's temperature. Then, an electronics module calculates the temperature based on the temperature signal, and displays the temperature on an LCD or other type of display.

The sensor elements for the conventional devices are generally thermistors or other silicon-based semiconductor devices. Although the cost of producing each such semiconductor device is not great, it is necessary to calibrate each and every such element, as there significant variations from one to the next. Consequently, the cost of both manufacturing and calibrating the temperature probes becomes prohibitive if the entire probe is intended to be disposable. For that reason, the probe itself is permanent and a disposable cap or cover is used over the probe. Replacing the covers for each patient is usually sufficient to prevent infection of one patient from another. Unfortunately, the cap or cover has a significant mass and thermal inertia, as does the thermistor, and this leads to disadvantages in operation.

Because of the mass of the temperature probe and that of the cover, and because of the insulating properties of the cover, temperature reading is a slow process. It can take about 30 seconds or more to achieve a stable temperature output from the probe.

Even though the plastic cup covering the probe will generally shield the probe from most bacteria, viruses, or other disease agents that might be found in the patient's mouth, it is still possible that the permanent probe can become invaded by microorganisms and pose a danger to subsequent patients.

Accordingly, it is an object of this invention to provide an electronic patient thermometer arrangement which avoids the problems of conventional electronic thermometers.

More specifically, it is an object of this invention to provide an electronic thermometer whose probe is completely disposable so that the risk of cross-infection of patients, or the risk of cross-infections of patients with physicians and nurses, is kept to a minimum.

It is another object of this invention to provide an electronic thermometer having a thermocouple-based probe which has a well-defined temperature output signal that does not need to be calibrated, and which can be provided at extremely low cost, so that the temperature probes can be considered completely disposable.

In accordance with an aspect of this invention, an electronic oral thermometer is provided with a plurality of disposable oral thermometer strips, each comprising an elongated non-conductive substrate with first and second conductors of different materials extending longitudinally on the substrate. These conductors are joined at a distal end of the substrate to form a thermocouple junction. The junction is uncovered, that is, exposed directly to the inside of the patient's mouth, while a covering layer of insulation can be placed over the conductors on the substrate from the distal to the proximal end. However, a window or similar means in the cover layer at the proximal end of the substrate is provided for exposing the conductors at the proximal end, such that the thermocouple junction can be electrically coupled to a temperature sensing device, such as an electronics module.

The medical thermometer device itself is formed with a housing having a magazine therein containing a plurality of such thermometer strips. A mechanism within the housing can be actuated for selectively extending successive ones of the strips in the magazine from the housing for oral insertion in the patient, and separating each of the strips from the remaining strips in the magazine. A contact element in the housing electrically contacts the exposed conductors of the strip extended from the housing, and a temperature determining circuit has an input coupled to the contact element and an output providing a temperature signal. This temperature signal is fed to a display on the housing, and this display provides a visual representation of the temperature signal.

In one preferred embodiment, the thermometer device employs as the magazine a cartridge in which successive individual strips are stacked one atop the next, with the cartridge including a resilient member or spring biasing the strips towards a top position. The selecting mechanism can include a slide member in the housing for selectively urging the strip at the top position outward to extend from the front of the housing. Each thermometer strip is individually ejected from the device as the next successive thermometer strip is pushed outward, so that each patient is presented with a fresh, unused, and sanitary thermometer strip. Further, this device avoids the need for the medical personnel to actually touch the strips.

In another preferred embodiment, the successive strips are joined end-to-end to form a continuous band, and the magazine in constitution as a supply roll within the housing on which the continuous band is wound. In this embodiment the selective means include a roller for advancing the band of the housing and a cutter element for separating an extended one of the strips from the next strip on the band.

In either of these preferred embodiments, the temperature determining electronics module includes an electronic cold-junction compensation integrated circuit coupled to the contact element. This integrated circuit provides a temperature-compensated reference for the thermocouple voltage provided by the thermocouple junction on the strip. This circuit then provides an output which is amplified in a linear amplifier, and fed to an analog-digital converter which provides a digital temperature signal. The latter is fed to a display drive, which, in turn, can be used to drive a liquid crystal display or other suitable display means. Preferably, a latch circuit is included in advance of the display drive for storing the digital temperature signal. This enables the device to display the patient's temperature after the disposable oral strip is removed from the patient's mouth.

With the device of this invention, the patient's temperature can be determined in an extremely short time: A typical cycle time is less than one second. This occurs because the exposed thermocouple junction itself has an infinitesimal mass, as compared with the mass of the probe and the disposable cover associated with conventional electronic thermometer devices.

Further, because thermocouple voltages are well defined, and do not vary from one junction to the next, provided the same two metals are used in each junction, it is completely unnecessary to calibrate the strips themselves. This leads to a significant reduction in manufacturing costs over present-day probes for electronic thermometers. For example, it is estimated that the cost of manufacture for the temperature probe strips according to this invention is well under five cents per probe, even taking into consideration the high degree of cleanliness and sanitation required during manufacture and the necessity for extreme quality control measures.

The above and many other objects, features, and advantages of this invention will become more apparent from the ensuing detailed description of preferred embodiments thereof, which description is to be considered in connection with the accompanying drawings, wherein FIG. 1 shows a first disposable temperature strip according to this invention;

FIGS. 2, 3, and 4 are cross sectional views of the strip of FIG. 1, taken at the lines 2—2, 3—3, and 4—4, respectively;

FIG. 5 is a diagrammatic elevation of a temperature sensing device according to a first embodiment of this invention;

FIG. 6 is a partial cross sectional view taken along the lines 6—6 of FIG. 5;

FIG. 7 is a top plan view of the device of FIG. 5;

FIG. 8 is a plan view of a continuous belt formed of thermometer strips.

FIGS. 9, 10, and 11 are cross-sectional views of the strip belt of FIG. 8, taken along lines 9—9, 10—10, and 11—11, respectively;

FIG. 12 is a diagramatic elevation of a thermometer device according to a second embodiment of this invention;

FIG. 13 is a cross-sectional view of the device of FIG. 12, taken along the lines 13—13;

FIGS. 14A and 14B are cross sectional views showing a cutter element, the views being taken along the line 14—14 of FIG. 12; and FIG. 15 is a circuit block diagram illustrating the electronics portion of the devices of this invention.

With reference to the drawings, and initially to FIGS. 1-4 thereof, a completely disposable thermometer probe 10 according to this invention is provided as a flat, elongated strip. The probe or strip 10 has a substrate 12 on which is disposed a cover layer 14, with a pair of wires or conductors 16 and 18 extending along the strip between the substrate 12 and the cover layer 14. These wires or conductors are of different materials; for example, the wire 16 can be copper and the wire 18 can be constantan. These run in parallel, with about two to three millimeters of separation. Preferably, the wires 16 and 18 are uncoated, and are held in position either by adhesive on the substrate 12 or by thermofusion of the substrate 12 with the cover layer 14.

The substrate and cover layer are preferably formed of thin, flexible, yet semirigid material, such as polyethylene.

A thermocouple junction 20 is formed at a tip 22 of the substrate 12. The cover layer 14 does not extend to the tip 22, and the thermocouple junction 20 is exposed. The junction 20 can also extend beyond substrate 12, or the substrate can be perforated under the junction. This permits the thermocouple junction 20 to reach thermal equilibrium with the patient's oral cavity within a period of less than one second.

A window 24 is cut from the cover layer 14 at the proximal end of the probe strip 10, so that the wires 16 and 18 are exposed, at least for a limited extent, at the proximal end of the probe strip 10. This permits the conductors or wires 16 or 18 to be electrically connected to a temperature determining circuit, to be described later.

The thermocouple-based probe strip 10 as described above can be manufactured at extremely low cost (for example, less than five cents each), yet is completely dispensable and thus eliminates danger of patient-patient or patient-practitioner cross-infection. In addition, the thermocouple junction 20 on the probe strip 10 is exposed, and has an extremely low thermal inertia. This results in the rapid temperature readings of patients' temperatures, and the readings can be easily and effectively carried out.

FIGS. 5-7 illustrate a practical embodiment of a small hand-held medical temperature instrument 30. As best shown in FIG. 5, the instrument 30 has a generally L-shaped housing 32 with one portion forming a main body 34 and another portion, one leg of the L, forming a handle 36. The side of the main body 34 away from the handle 36 has a mouth 38 from which the probe strips 10 are dispensed. An electronics module 40 disposed in the handle 36 is coupled to a digital display 42 visible on the back of the handle 36. A trigger or switch 44, for actuating the electronics module, is disposed on the handle 36, and a battery 46 for powering the electronics module 40 is fitted within the handle 36. Within the main body 34 is a magazine or cartridge 50 containing a stack of separate, individual probe strips 10. Here, the strips are on the order of 7-10 centimeters in length and 0.2 millimeters thick; and the cartridge 50 contains a stack 52 of probe strips 10. In an optimum embodiment, this stack 52 can contain one hundred such strips 10 stacked atop one another. A plate 54 beneath the bottommost strip 10 is urged upwards by a spring 56 so that the strips 10 are presented, one at a time, at the top of the cartridge 50.

An actuator button 58 is slidable back and forth in a slot 62 (FIG. 7) on the top of the main body portion 34 of the housing 32. This actuator button 58 has a grip member 60 which contacts the topmost probe strip 10 in the cartridge, and the member 50 grips the probe strip 10 when the actuator button 58 is slid towards the handle 36. Then, when the actuator button 58 is slid forward in the slot 62, the grip 60 bears against the proximal end of the topmost strip 10, and urges it forward and out the mouth 38. This action also ejects the previously-used probe strip 10 by urging of the next strip 10, so that it is unnecessary for the medical practitioner to actually handle a used probe strip 10.

When the actuator button 58 has urged the probe strip all the way forward, the exposed thermocouple wires 16 and 18 are contacted by means of a contact member 64, as best shown in FIG. 6. This contact member 64 catches the proximal end of the probe strip 10 at the position of the window 24, and has contacts 66 and 68 thereon to press against the exposed wires 16 and 18, respectively. A spring 70 resiliently urges the contact member 64 against the proximal end of the strip 10 to ensure good electrical contact. The contacts 66, 68 and the leads connected therewith are of the same metal as the associated wires 16, 18, so that no thermocouple voltages are generated except at the junction 20.

If the trigger 44 is depressed, the display 42 will show the temperature of the thermocouple junction 20 of the extended probe strip 10. If the thermocouple junction is appropriately placed in the patient's oral cavity, the patient's oral temperature will be displayed substantially instantaneously (i.e., in less than one second). Once the patient's oral temperature has been read, the exposed probe strip 10 can be thrown away, and a new strip can be pushed into position. Similarly the probes can be used to measure temperature in other body areas such as rectum, armpit, etc.

The thickness of each strip is preferably about 0.2 millimeters, so that the cartridge or magazine can be constructed about four centimeters thick to contain as many as one hundred probe strips.

The current draw for the electronics module 40 and the digital display 42 is extremely low; consequently, it is not necessary for the medical practitioner to turn off the device 30 between successive measurements.

A second construction of the probe strips according to this invention is shown in FIGS. 8, 9, 10, and 11. Elements of this probe strip that are generally similar to those in the probe strip 10 described previously are identified with the same reference characters, but raised by 100.

Here, a belt 100 is formed as a continuous arrangement of successive strips 110, with each strip being formed of a substrate 112 and a cover layer 114 having disposed therebetween a pair of thermocouple wires 116 and 118 formed of different metals. The wires 116 and 118 are joined periodically to form thermocouple junctions 120, and a thermocouple window 122 is disposed in either the substrate 112 or the cover layer 114 or both at the position of each such thermocouple junction 120.

A contact window 124 is formed in one or the other of the substrate 112 and cover layer 114 for exposing the wires 116 and 118 at the proximal end of each of the successive strips. Here, cut lines 126 are shown at a position between the contact window 124 of each strip and the thermocouple window 122 of the next successive strip 110. These cut lines, which represent the position at which a cutting device will sever the belt to form each individual probe strip 110, here demark the illustrated belt 100 into the plurality of successive strips 110 formed thereon.

As shown in FIG. 8, there is disposed between the thermocouple window 122 and the contact window 124 of each strip 110 a crossover 128. At the latter, the thermocouple wires 116 and 118 cross, at an angle of about 45 degrees. This crossover 128 serves as means for ensuring that the respective wires 116 and 118 are always at the same relative position within the contact window 124 for each of the successive strips 110 on the belt 100. The substrate and cover layer 112, 114 are preferably formed of a thin, flexible synthetic resin material, so that the belt, containing up to one hundred strips 110 can be wound as a coil disposed on a spool. Preferably, the strips 110 are each about 0.1 millimeters in thickness, about 0.5–1.0 centimeter in width, and approximately seven to ten centimeters in length.

A second embodiment of the medical thermometer device according to this invention is shown in FIGS. 12, 13, 14A, and 14B. With initial references to FIGS. 12 and 13, in which elements that are similar to those shown in the first embodiment are identified with the same reference numbers, but raised by 100, the instrument 130 has a housing 132 formed of a main body 134 and a handle 136 extending from one side thereof. On the other side of the main body 134 is a mouth 138 from which the temperature probe strips 110 operatively extend. An electronics module 140 is disposed within the main body portion 134 and a digital display 142, driven by the electronics module 142, is positioned on the outside of the main body 134. A trigger mechanism 144 is positioned on or near the handle 136 and a battery or power cell 146 is contained within the handle 136.

The belt 100, formed of the plurality of temperature probe strips 110, is coiled as a roll 150 wound on a spool 152 within the main body portion. A friction drive wheel 154 is associated with the spool 152 for advancing the same in the direction shown in arrows. Preferably, this wheel 154 has a ratchet, unidirectional action.

The belt 100 extends from the spool 152 through a drive capstan 158 and a press roller 160 which is urged thereagainst. A guide roller 162 is disposed along the path of the belt 100 after the position of the drive capstan 158 and the press roller 160.

A drive roller wheel 164 is disposed within the main body 134 of the housing 132, and frictionally contacts the drive capstan 158, and the guide roller 162. A lever 166 pivotally mounted on the side of the housing 132 directly turns the drive wheel 164. The drive wheel 164 is dimensioned, relative to the capstan 158 and drive roller 162, so that a single stroke of the lever 166 advances the belt 110 exactly the length of one strip 110, that is, exactly the distance from one cut line 126 to the next cut line 126.

Not shown is a spring return that returns the lever 166 to its initial position.

A contact member 170 is spring biased against the guide roller 162, with the strip 110 disposed therebetween. At the end of a stroke of the lever 166, the contact window 124 of each strip 110 is at the position of the contact member 170, so that respective contact elements (not shown) are biased into contact with the exposed wires 116 and 118.

When a successive one of the strips 110 is advanced such that the thermocouple junction 120 thereof protrudes about seven centimeters from the end of the mouth 138, and the exposed part of the wires 116 and 118 are positioned at the contact member 170, the strip 110 is severed from the remaining strips 110 on the belt 100 by cutting at the cut line 126. To accomplish this, a cutter 172 and an associated guide 174 are disposed between the positions of the capstan 158 and the guide roller 162. The construction of the cutter 172 is better shown in FIGS. 14A and 14B.

As shown in FIG. 14A, the cutter 172 has a bevelled cutting edge 176 at one side thereof, and a cam edge at the other side thereof, extending out from the side of the housing 132. The lever 166 contacts the cam edge 178 to cam it inwards (i.e., to the right, as shown in FIG. 14). This cam edge 178 moves the cutter 172 inwards into the position shown in FIG. 14B when the handle 166 comes to the end of its stroke.

Then, after the foremost of the strips 110 is severed from the remainder of the belt, the lever 166 is released and is spring-returned to its initial position. The severing of each successive probe strip 110 prevents erroneous temperature readings which would otherwise be induced at the successive thermocouple junctions.

The contacts of the contact member 170 are also formed of the same material as the respective thermocouple wires 116 and 118 so that there are no spurious thermocouple voltages created.

As with the instrument 30 of the first embodiment, the instrument 130 according to this embodiment permits the rapid measurement of a patient's oral temperature. That is, once the extended probe strip 110 is placed appropriately in the patient's mouth, and the trigger 144 is depressed, the patient's temperature will appear substantially instantaneously on the display 142. Then, after the temperature measurement has been completed, the used probe strip 110 can be disposed, and a fresh one advanced simply by actuating the lever 166.

The electronic circuitry for the electronics modules 40, 140 of the embodiments of this invention are shown diagrammatically in the circuit diagram of FIG. 15.

As shown in the diagram, the thermocouple wires 16 (or 116) and 18 (or 118) of the probe strip 10 (or 110) are connected through the associated contact member 64 (or 170) and lead lines $L_1$ and $L_2$ to an electronic cold junction compensation circuit 182. The leads $L_1$ and $L_2$ are, for example, copper and constantan, respectively. That is, these leads $L_1$ and $L_2$ should be made of the same metal as the contacts on the contact member 64 (or 170), and the respective thermocouple wires 16 (or 116) and 18 (or 118), so that there are no stray thermocouple voltages created.

The electronic cold-junction compensation circuit 182 is a conventional, available integrated circuit. This circuit 182 is precalibrated and puts out a DC output signal proportional to the thermocouple junction temperature. The compensation circuit 182 automatically takes into account the actual temperature of the circuit 182 itself. The output voltage of this circuit 182 is a DC voltage signal that is proportional to the thermocouple junction temperature. This signal changes by about 30 to 50 microvolts per degree Celsius, and provides an accuracy of about ±0.1 degrees Celsius. This accuracy is comparable to that of any conventional electronic thermometer.

The DC output signal from the circuit 182 is provided to one input of a linear amplifier 184, and a reference voltage is provided to another input thereof. This amplifier 184 has a gain of about one hundred that is constant over the range of the output of the circuit 182. This amplifier supplies the amplified DC level to an analog-to-digital converter 186. The converter 186 favorably has a digitalization speed of two to five cycles per second. Favorably, this converter 186 provides sufficient digits to correspond to 3½ decimal digits, and the outputs of this converter 186 are provided to a latch circuit 188. The latter serves to hold the digital temperature signal provided by the converter after a temperature reading of a patient's oral temperature. The latch is followed by a digital display drive circuit 190, which drives the digital display 42 through a bus line 192.

The digital display 42 is favorably a "3½-digit" display, providing three full digits and an additional unit or "1". This allows the display 42 to track a patient's Fahrenheit temperature in a range through normal temperatures up into the fever range of over 100° F. The display 42 could also be arranged to display the patient's temperature in degrees Celsius, in which case a three-digit display would be sufficient.

The display 42 can also contain a battery level indicator, and an on/off indicator. These indicators are favorably actuated through the drive circuit 190.

In this preferred embodiment, the digital temperature display 42 is a liquid crystal display. This has the benefit of low battery drain so that the thermometer device can be left on for extended periods of time. However, a fluorescent display or an LED display could be used instead, if the device is to used in a low-light environment.

Instead of the latch circuit 188, it is possible to provide a hold circuit associated with the display 42 to permit reading of the patient's temperature after the probe strip 10 or 110 is removed from the patient's mouth.

Many possible variations of the disposable thermometer strips 10, 110 and of the medical thermometer devices 30, 130 of this invention could be constructed without departing from the principles of this invention. For example, on the strip 10, the window 24 can be cut out from either the cover layer 14 or the substrate 12, or can be cut from both of them. Also, rather than having wires, copper and constantan strips can be emplaced on the substrate or cover layer employing printed circuit techniques. Further, while the strip 10 or 110 should be elongated so that it can be inserted in the patient's mouth, it need not be the flat design as illustrated, and could be somewhat rounded in cross section. The rounded configuration is suitable for rectal use. Still further, the thermometer devices 30, 130 need not have the constructions exactly as shown, but could use many of several other configurations, sizes, or shapes.

While certain preferred embodiments have been herein described with reference to the accompanying drawings, it should be apparent that many variations thereof would present themselves to persons of skill in the art without departure from the scope and spirit of this invention, which are to be defined by the appended claims.

What is claimed is:

1. Medical thermometer device comprising in combination a housing; magazine means within said housing containing a plurality of thermometer strips, each of said thermometer strips including an elongated substrate, an elongated cover layer, a first conductor made from a first material, and a second conductor made from a second material, the first material and the second material being different, said first and second conductors being located between said substrate and said cover layer and extending longitudinally therebetween, said first and second conductors at a preselected location along said thermometer strips being joined near a distal end of said strip to form a thermocouple junction, said junction being exposed; means for selectively extending successive ones of said strips from said housing for insertion in a patient, and separating each of said strips from the next successive strip in said magazine means; contact means in said housing for selectively electrically contacting said first and second conductors, said contact means including a first contact made from the first material and a second contact made from the second material, said first contact selectively contacting said first conductor, said second contact selectively contacting said second conductor; temperature determining circuit means having an input coupled to said contact means and an output providing a temperature signal, said temperature determining circuit means being connected to said contact means by a first lead and a second lead, the first lead being made from the first material, the second lead being made from the second material, the first lead being connected to said first contact, the second lead being connected to said second contact; and display means on said housing coupled to said output for providing a visual representation of said temperature signal.

2. Medical thermometer device according to claim 1, wherein said housing is generally L-shaped, with a leg thereof serving as a handle, the device and is dimensioned to be hand held.

3. Medical thermometer device according to claim 1, wherein said successive strips are individual strips, said magazine means has said strips arranged one atop the next and includes resilient means biasing said strips towards a top position, and said selective extending means includes a slide member in said housing for selectively urging the strip at said top position outward from said housing.

4. Medical thermometer device according to claim 1 wherein said successive strips are joined end-to-end to form a continuous band; said magazine means includes a supply roll within said housing on which said continuous band is wound; and said selective extending means includes roller means advancing said band out said housing and cutter means for separating an extended one of said strips from the next strip on said band.

5. Medical thermometer device according to claim 1, wherein said temperature determining means includes electronic cold-junction compensation circuit means coupled to said said first and second leads and providing a thermocouple output signal, analog-digital converter means providing a digital temperature signal based on said thermocouple output signal, and digital display drive means having an input coupled to receive said digital temperature signal and an output coupled to said display means to drive the same.

6. Medical thermometer device according to claim 5, wherein said temperature determining means further includes linear amplifier means disposed between said cold junction compensation circuit means and said analog-digital converter means.

7. Medical thermometer device according to claim 5, wherein said temperature determining means further includes a digital latch between said analog-digital converter means and said digital display drive means for storing said digital temperature signal so that said display means continues to display a patient's temperature after the thermometer strip is removed from contact with the patient.

8. Medical thermometer device according to claim 1, wherein said cover layer has a window exposing said first and second conductors and wherein said first and second contacts extend into said window to contact said first and second conductors.

* * * * *